United States Patent Office 3,848,047
Patented Nov. 12, 1974

3,848,047
BRASSIDOYL PROPYLENE GLYCOL HYDROGEN SUCCINATE
Paul Seiden, Cincinnati, Ohio, assignor to The Procter & Gamble Company, Cincinnati, Ohio
No Drawing. Original application Dec. 29, 1970, Ser. No. 102,525, now Patent No. 3,694,215. Divided and this application June 7, 1972, Ser. No. 260,689
Int. Cl. A23d 5/00; C07c 69/40
U.S. Cl. 260—404.8                       1 Claim

ABSTRACT OF THE DISCLOSURE

The novel compound brassidoyl propylene glycol hydrogen succinate (BSPGHS) having use as a shortening composition additive is produced. A novel liquid shortening composition is also produced by mixing a glyceride base oil, BSPGHS, propylene glycol fatty monoester and mono- and diglycerides, desmoking the mixture and winterizing the desmoked mixture. The shortening composition is clear at temperatures above 60° F., pourable at refrigerator temperatures, rapidly recovers its clarity when removed from refrigerator temperatures to temperatures above 60° F., has minimal smoking tendencies, and possesses excellent cake baking properties.

CROSS REFERENCE

This application is a divisional application of earlier filed co-pending application, Ser. No. 102,525, filed Dec. 29, 1970 now U.S. Pat. 3,694,215, patented Sept. 26, 1972.

BACKGROUND OF THE INVENTION

This invention relates to a novel compound having utility as an additive for a novel shortening composition. Additionally, this invention relates to liquid shortening containing the novel additive which is capable of producing excellent quality cakes.

Substantially all shortenings in general use today are glycerides in one form or another. Although the naturally occurring liquid triglyceride oils have been used to some extent as "shortening," they have in general been found to be unsatisfactory for cake baking purposes in the absence of the addition of various emulsifiers. It has been the more usual practice to hydrogenate or harden liquid triglyceride oils with the result that the plastic or solid shortenings are the most common type available in the market today. These plastic shortenings usually are combined with emulsifiers and other additives of various kinds to enhance the properties of the shortening and provide good cake performance in terms of volume, texture, and tenderness.

Because of the inconvenience of the plastic or solid shortening with respect to handling, measuring, and mixing especially with other cake making ingredients it is desirable to use a liquid shortening. However, the emulsifiers that were so effective in the plastic shortening have been found to be deficient when used in a liquid shortening.

Various combinations of emulsifiers have been used in liquid shortenings and some have been successful to a limited degree. While it is necessary that the shortening composition, when used in cake baking, enhance cake batter stability and produce a cake of greater volume, it is also important that the liquid be clear at about 60° F., be able to recover its clarity at temperatures above 60° F. when the temperature of the liquid oil drops below about 60° F., be pourable at refrigerator temperatures, and have a minimal smoking tendency at frying temperatures. The latter requirement is necessitated by the fact that liquid oils are used by the consumer for functions other than as a cake making ingredient, e.g., frying. The prior art is replete with teachings as to how to obtain these various requirements. For instance, U.S. Pats. 3,293,272 and 3,370,958 disclose that half esters of succinic acid with monoacylated propylene glycol find use as cake functional emulsifiers at a weight level of at least 4% in a liquid oil such as cottonseed oil, soybean oil or peanut oil. These references state that the acyl radical, i.e. the fatty acid residue, should be substantially completely hydrogenated. Unsaturated fatty acid residue such as oleic and linoleic acid residues are described as providing compounds that are ineffective. However, some prior art emulsifiers have proven to be unsatisfactory, especially from the standpoint of producing liquid shortenings which maintain clarity after subjection to refrigerator temperatures.

Accordingly, it is an object of the present invention to produce a shortening composition that is clear at temperatures above 60° F., pourable at refrigerator temperatures, rapidly recovers its clarity when removed from refrigerator temperatures to temperatures above 60° F., produces cakes that are of excellent quality and high volumes, and that has minimal smoking tendencies at frying temperatures.

It is a further object of this invention to produce a novel compound having utility as a shortening additive.

It is a still further object of this invention to produce a shortening composition containing a unique combination of emulsifiers.

These and other objects will become apparent from the description and examples that follow hereinafter.

SUMMARY OF THE INVENTION

A novel liquid oil additive, brassidoyl propylene glycol hydrogen succinate (BSPGHS), is produced. A novel liquid shortening composition is also produced by: (a) mixing with a liquid glyceride base oil from 0.8%–2.5% BSPGHS, from 1%–6% propylene glycol fatty monoester with the ester group containing from 16 to 22 carbon atoms and no more than 1.5% of the total composition containing propylene glycol fatty monoester having an ester group containing 22 carbon atoms, and from 0.2%–2.0% fatty mono- and diglycerides containing from 14 to 22 carbon atoms, each by weight of the total composition; (b) desmoking the composition of (a) by steam stripping at a temperature of 320° F. to 350° F. for from 30 minutes to 80 minutes; and (c) winterizing the desmoked solution at 50° F. to 70° F. for from 1 hour to 12 hours.

DESCRIPTION OF THE INVENTION

In general, the present invention comprises the making of a novel shortening additive, brassidoyl propylene glycol hydrogen succinate (BSPGHS) and the making of a novel shortening composition containing a unique combination of emulsifiers.

The novel compound produced in accord with this invention and having particular utility as a liquid shortening additive is BSPGHS. BSPGHS is conveniently made from the propylene glycol monoester of brassidic acid (PGMBS) by succination. PGMBS in turn is made from propylene glycol and brassidic acid by direct esterification. In a typical example, brassidic acid was reacted with propylene glycol in a 1:10 molar ratio in 6 times their combined weight of xylene. The reaction was carried out int he presence of a p-toluene sulfonic acid catalyst. The reaction mixture was agitated mechanically for four hours while heating at refluxing temperature. It was then cooled below 212° F. and washed four times, each time with two times its volume of hot water. The resultant mixture was then dried and mixed with succinic anhydride in a 1:1.2 molar ratio. This reaction mix was refluxed for 6 hours at about 280° F. The crude reaction product in xylene was then cooled to below 212° F., water washed with two times its volume of hot water, and dried. The product was obtained by adding sufficient hexane to dissolve the residue and crystallizing it out of solution at 34° F. A second crystallization from hexane at 34° F. produced the BSPGHS. It had a white, crystalline appearance and a melting point of about 53° C. Thin layer paper chromatography analysis revealed that the product was about 98% pure BSPGHS.

Alternatively the reaction between the propylene glycol monoester of brassidic acid and succinic anhydride can be carried out at temperatures of from about 32° F. to about 160° F. in solvents such as chloroform, benzene, and ethyl acetate and in the presence of perchloric acid catalyst. The isolation procedure is the same as above described. In some cases the above described reactions can be carried out without the presence of any solvent.

In accord with this invention it has been found that when the novel compound BSPGHS is used in combination with certain known emulsifiers in a liquid triglyceride base oil there is obtained a unique liquid shortening composition possessing many desirable properties. This novel liquid shortening, prior to desmoking and winterizing as explained hereinafter, comprises a liquid triglyceride base oil and as emulsifiers from 0.8% to 2.5% BSPGHS, from 1% to 6% propylene glycol fatty monoester, and from 0.2% to 2% fatty mono- and diglycerides each by weight of the shortening. Additionally, up to 0.5% of behenoyl propylene glycol hydrogen succinate (BPGHS) can replace an equal weight amount of BSPGHS. The total emulsifier content of the shortening prior to desmoking and winterizing amounts to 2% to 8% by weight. Lesser amounts fail to give any noticeable emulsifier effect while emulsifier levels greater than 8% by weight of the shortening adversely affect the taste and texture of a cake containing the same. Preferably the shortening composition prior to desmoking and winterizing comprises a liquid triglyceride base oil, from 1% to 2% BSPGHS, from 1% to 5% propylene glycol fatty monoester, and from 0.2% to 1% fatty mono- and diglycerides with the total emulsifier content being from 2.2% to 7%.

The base oil of the fluid shortening of this invention is a normally liquid triglyceride. Suitable base oils of this shortening can be derived from animal, vegetable, or marine sources including naturally-occurring liquid triglyceride oils such as cotonseed oil, soybean oil, rapeseed oil, coconut oil, crambe oil, cambra oil, safflower oil sesame seed oil, sunflower and sardine oil. Also suitable liquid oil fractions can be obtained from palm oil and lard, as for example, by fractional crystallization or interesterification with similtaneous crystallization of insoluble glycerides, followed by separation of the liquid oil fraction. Oils predominating in glycerides of unsaturated acids may require partial hydrogenation to maintain flavor. Refined cottonseed oil and refined and partially hydrogenated soybean oil (iodine value of about 110±10) have been found to be very suitable for use as glyceride base oils of this invention. Partially hydrogenated oils can be winterized to assure continued clarity. Preferably the base oils of this invention are desmoked by known methods, e.g., steam stripping prior to having added thereto the novel emulsifier system of this invention.

The propylene glycol fatty monoesters used in the above shortening composition are well known compounds. The ester group contains 16 to 22 carbon atoms with not more than 1.5% being monoester containing 22 carbon atoms; greater amounts of $C_{22}$ create clarity problems in the ultimate product. Examples of this component found useful in this invention are propylene glycol monostearate, propylene glycol monobrassidate, and propylene glycol monobehenate.

Fatty mono- and diglycerides are also present in the shortening composition for their emulsifier effect. These glycerides can be either pure esters of fatty acids having from 14 to 22 carbons, or mixtures of fatty acid esters containing such fatty acids. They are conveniently prepared by the superglycerination of fats or oils which consist of reacting triglyceride fat or oil, for example, cottonseed or soybean oil with excess glycerine in the presence of an alkaline catalyst such as sodium hydroxide. The ratio of mono- to diglycerides of this addition is not important, the only concern being that a level of 0.2% to 2% of either monoglyceride, diglyceride, or a mixture be present.

BPGHS useful in this invention to replace up to 0.5% by weight of shortening of the BSPGHS is a known compound. BPGHS is substituted whenever possible for the BSPGHS because of economic considerations. Slightly better cake making performance is also observed when limited amounts of the BPGHS is substituted for the BSPGHS in the shortening of this invention. The reason for this phenomena is not known. The amount of BPGHS included in the shortening composition, however, must be limited to not above 0.5% because of the fact that higher levels impair the clarity of the liquid shortening.

Additional minor ingredients can be added such as flavor, color, antioxidants, crystal modifiers and other known shortening additives. Examples of known additives that can be added to the novel shortening composition of this invention are methyl silicone, butylated hydroxytoluene, butylated hydroxyanisole, sorbic acid, and polysorbates.

The clear oil shortening is prepared by first disclosing all the emulsifier components in the liquid triglyceride base then desmoking the solution by steam stripping. Steam stripping at a temperature ranging from 320° F. to 350° F. for from 30 minutes to 80 minutes has the beneficial effect of removing the components that impart organoleptically objectionable features to the shortening and also of improving the smoking tendencies of the shortening composition, i.e. reducing the tendency of the shortening to smoke excessively at ordinary frying temperatures. For a description of steam stripping, see U.S. Pat. No. 3,506,697. The steam stripped liquid oil is next "winterized." "Winterizing" refers to the known process whereby the shortening composition is first carefully cooled to a low temperature, i.e. for the purposes of this invention from 50° F. to 70° F. for 1 hour to 12 hours. This permits precipitation of solid high melting material that can then be separated from the liquid oil to complete the winterization process. The resultant liquid oil is less susceptible to clouding when stored by the consumer for extended times at low temperatures. It should be understood that the purpose for winterizing is to remove solid materials that precipitate out at low temperatures and are responsible for the cloudiness of a liquid oil and that this step can be eliminated if all of the components of the shortening composition of this invention are soluble at low temperatures, i.e., 60° F. and above.

The liquid oil made by the above process is clear at temperatures above 60° F., recovers its clarity at 60° F. if cooled below this temperature, is pourable at refrigerator temperatures, and has minimal smoking tendencies.

The shortening of this invention is used in the preparation of all types of cakes, e.g. white. yellow, and chocolate cakes as well as many others. Cakes containing the shortening of this invention in their formulation possess excellent eating qualities and high cake baking performance. Generally from 8% to 20% of the instant shortening from 35% to 45% sugar, and from 30% to 45% flour on a dry ingredient weight basis are used in the making of the high quality cakes of this invention. It should be understood that while the novel shortening of this invention has been described as being especially useful in the making of cakes, it is also useful as a general purpose liquid shortening finding utility in the making of breads, biscuits, sweet yeast breads and pie doughs, and in frying.

The following examples are offered to illustrate the making of the novel shortening composition and the use of the novel shortening composition in cakes. Unless indicated otherwise, all percentages are on a weight basis.

EXAMPLE I

Formulation:

| | Percent |
|---|---|
| BSPGHS | 1.4 |
| Propylene glycol monostearate | 2.6 |
| Propylene glycol monobrassidate | 1.0 |
| Propylene glycol monobehenate | 0.3 |
| Mono-diglyceride of palm oil | 1.0 |
| Behenic acid | 0.2 |
| Soybean oil, IV=107 (winterized and deodorized) | 93.500 |

After all of the additives are dissolved in the oil the product is desmoked by passing steam at 325° F. through the product for about 60 minutes. The resultant product is next winterized to remove the higher melting components of the emulsifiers by cooling the desmoked product to 60° F. and holding it at that temperature for about 3 hours. This solution is next filtered to give a clear oil shortening product that is clear at 60° F., pourable at refrigerator temperatures, and recovers its clarity when removed from refrigerator temperatures to temperatures above 60° F. The poduct also has a smoke point about 20° F. lower than the smoke point of a leading commercially available all-purpose shortening. The quality of cakes made using this unique shortening composition can be seen by the following example.

EXAMPLE II

Cakes are prepared according to the following formula:

| Ingredients: | Wt. in grams |
|---|---|
| Cake flour | 107 |
| Granulated sucrose | 133 |
| Sodium chloride | 25 |
| Double-acting baking powder | 6.8 |
| Shortening (as prepared by Ex. I) | 47.5 |
| Whole milk | 90 |

(Mix for 2 min. on a conventional household mixer at 500 r.p.m.)

Add:

| | |
|---|---|
| Fresh egg white | 60 |
| Whole milk | 40 |

(Mix additional 2 min. at 500 r.p.m.)

Scale 8-inch pans at 400 g. batter
Baking temperature, 365° F.
Baking time, 25 min.

The resultant cakes have high volumes and possess excellent eating qualities.

When 0:5% BPGHS replaces an equal amount of BSPGHS in the formation of Example I, the shortening prepared therefrom shows slighly better cake making performance qualities than the shortening of Example I.

What is claimed is:

1. Brassidoyl propylene glycol hydrogen succinate.

References Cited

UNITED STATES PATENTS

| 3,375,262 | 3/1968 | Martin | 260—404.8 |
| 3,371,102 | 2/1968 | Martin | 260—347.4 |
| 3,410,881 | 11/1968 | Martin et al. | 260—404.8 |

FOREIGN PATENTS

| 1,025,238 | 4/1966 | Great britain. |

LEWIS GOTTS, Primary Examiner

D. G. RIVERS, Assistant Examiner